United States Patent
Dessenberger, Jr.

[11] Patent Number: 6,059,231
[45] Date of Patent: May 9, 2000

[54] HANDLE ASSEMBLY FOR AN AIRCRAFT DOOR OR THE LIKE

[75] Inventor: Arthur W. Dessenberger, Jr., Tehachapi, Calif.

[73] Assignee: Hartwell Corporation, Placentia, Calif.

[21] Appl. No.: 09/116,027

[22] Filed: Jul. 15, 1998

[51] Int. Cl.[7] .................................................. B64C 1/14
[52] U.S. Cl. ................................. 244/129.5; 292/336.3; 70/208
[58] Field of Search .............................. 244/129.4, 129.5; 70/208; 292/DIG. 25, 336.3, 347, DIG. 31

[56] References Cited

U.S. PATENT DOCUMENTS

| | | | |
|---|---|---|---|
| 2,349,192 | 5/1944 | Oxhandler | 70/208 |
| 2,357,049 | 8/1944 | Leonard | 70/208 |
| 2,486,586 | 11/1949 | Brittain et al. | 70/208 |
| 2,536,295 | 1/1951 | Leonard, Sr. | 292/DIG. 25 |
| 3,111,833 | 11/1963 | Dettmer | 70/208 |
| 4,099,751 | 7/1978 | Poe et al. . | |
| 4,130,260 | 12/1978 | Poe . | |
| 4,487,440 | 12/1984 | Beijer | 292/336.3 |
| 5,156,359 | 10/1992 | Noble et al. . | |

OTHER PUBLICATIONS

Hartwell Latch Assembly Flush Handle, No. H3412 (five sheets).

*Primary Examiner*—Galen L. Barefoot
*Attorney, Agent, or Firm*—Pretty, Schroeder & Poplawski, P.C.

[57] ABSTRACT

A handle assembly used for actuating the latch mechanism of an aircraft door to control the opening and the closing of the aircraft door. The handle assembly includes an interior handle, an exterior handle, an actuator, and an exterior housing having a recess. The interior handle and the exterior handle each have an open and a closed position, respectively, and are connected to the actuator. The actuator is rotatably mounted within the exterior housing and the exterior housing is mountable within the aircraft door. The actuator may be secured to the latch mechanism of the aircraft door and the latch mechanism may be operated by the actuator. The rotation of the interior handle to the open position moves the actuator such that the latch mechanism is actuated to the open position allowing the aircraft door to be opened. A cam is connected to the interior handle and is rotatably mounted relative to the exterior handle. During the initial rotation of the interior handle towards the open position, the cam is rotated such that the exterior handle is pushed outwards from the recess of the exterior housing. During the further rotation of the interior handle, the exterior handle rotates in unison with the interior handle towards the open position. The handle assembly also includes a biasing element, such as a spring. When the interior handle is rotated to the closed position, the biasing element automatically pulls the exterior handle back into the recess of the exterior housing.

20 Claims, 13 Drawing Sheets

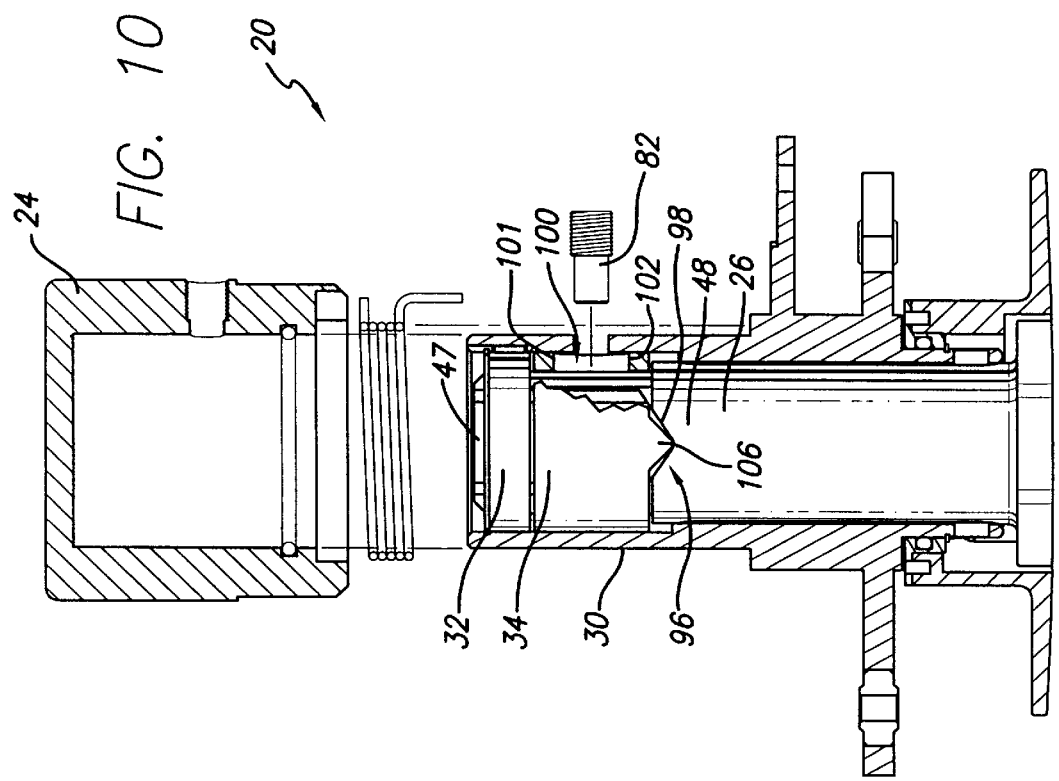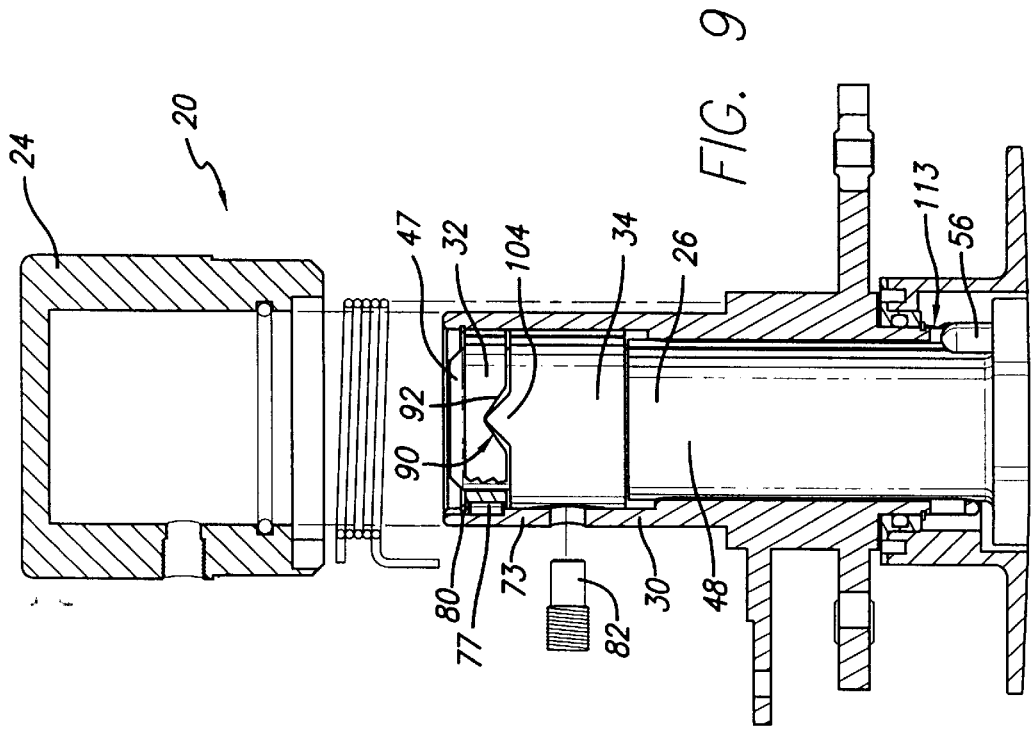

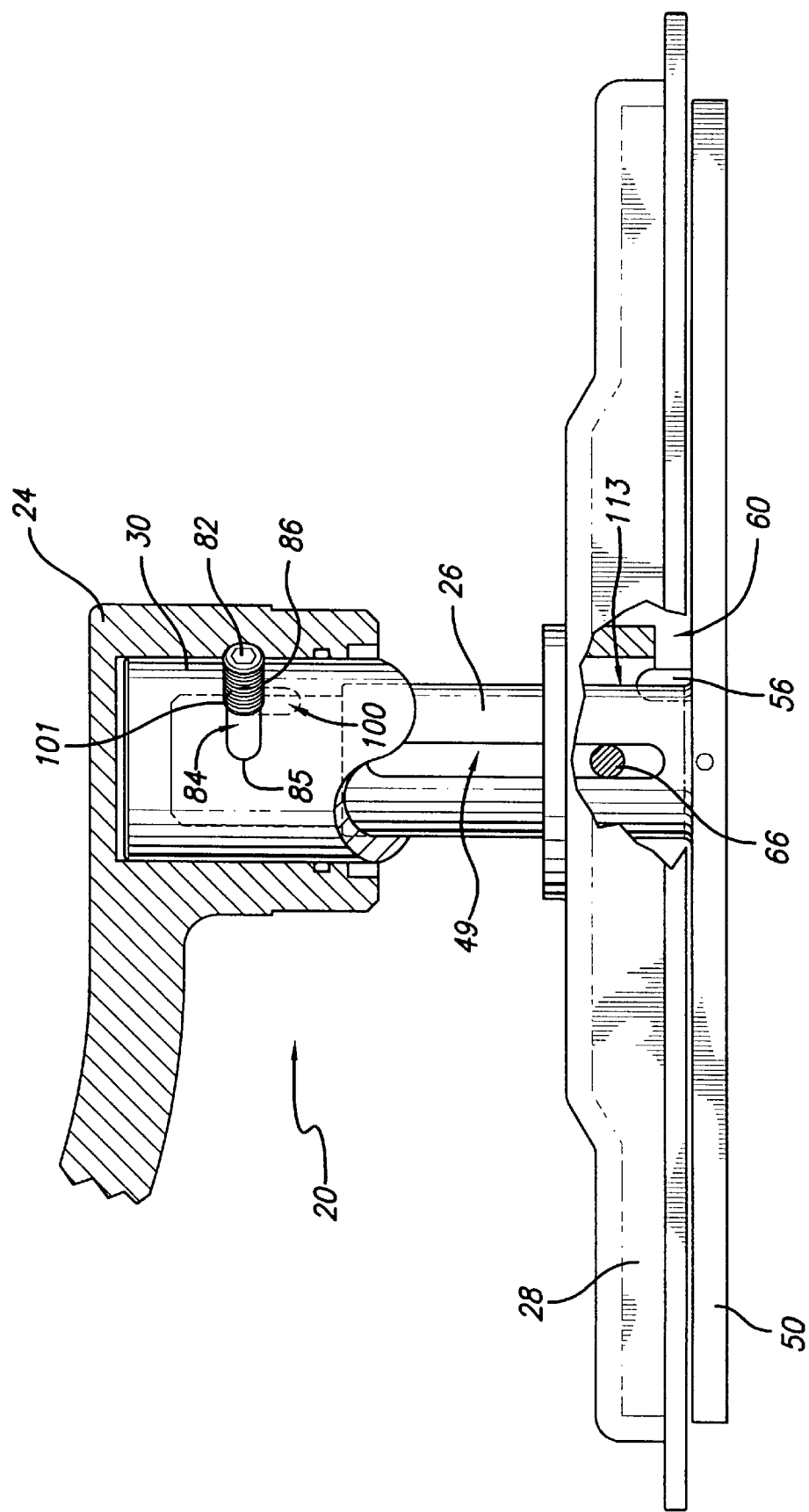

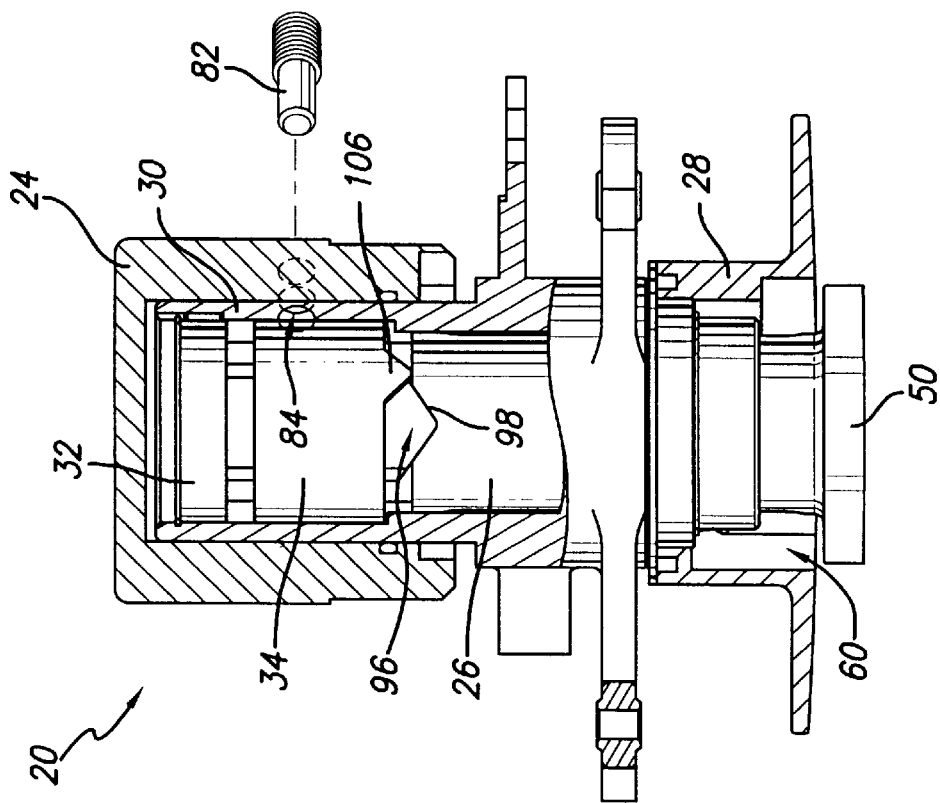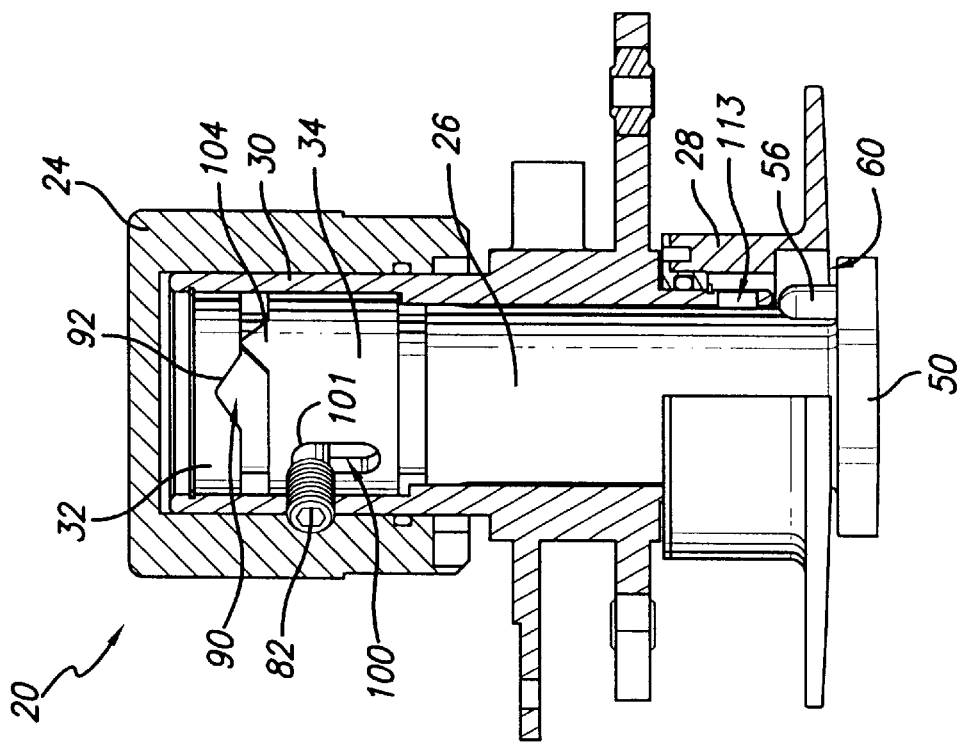

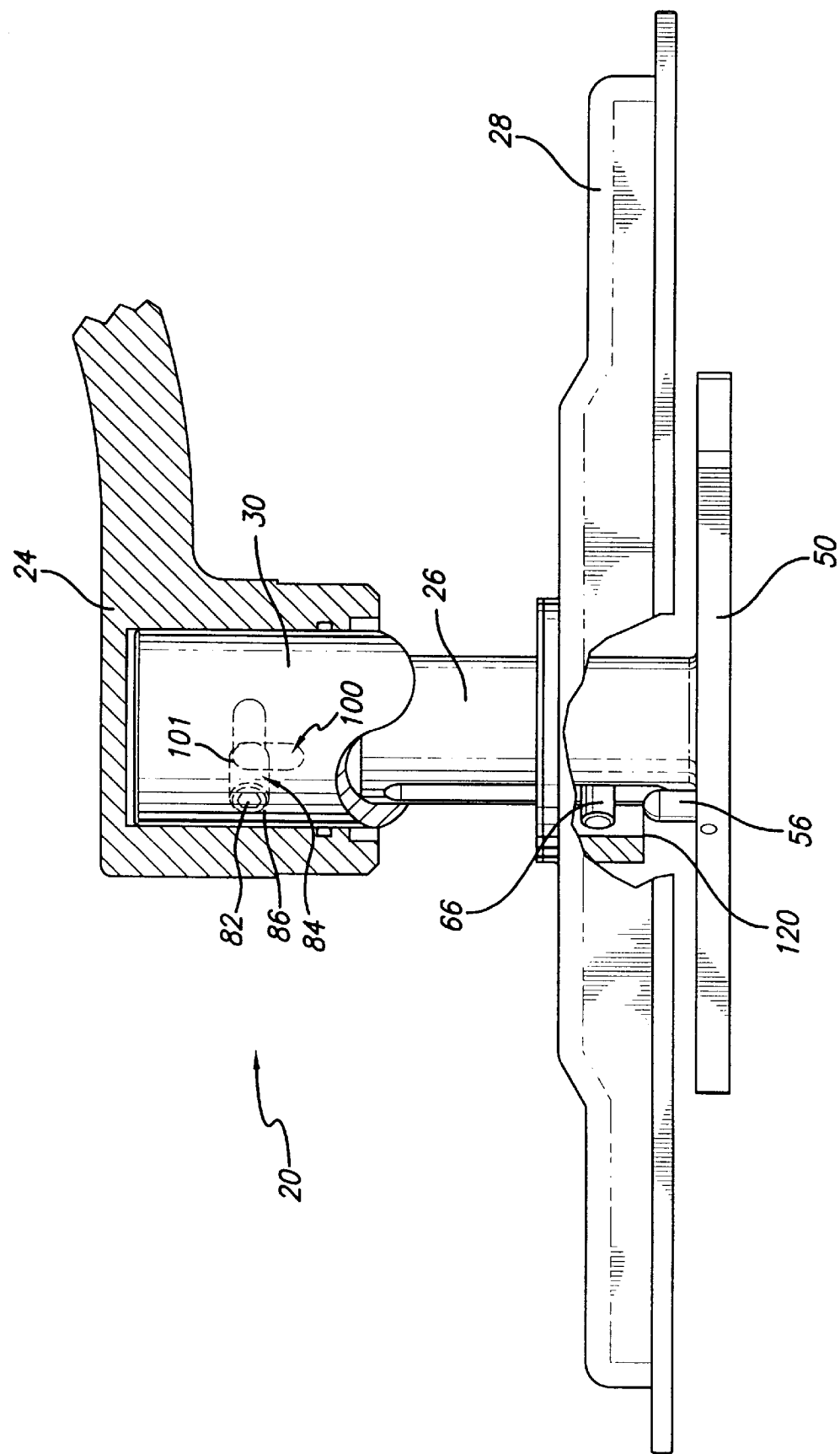

HANDLE ASSEMBLY FOR AN AIRCRAFT DOOR OR THE LIKE

The present invention relates generally to the field of handle assemblies and, more particularly, to a handle assembly utilized in a latch mechanism which secures an aircraft door to an aircraft structure. Although the present invention is subject to a wide range of applications, it is especially suited for use with aircraft, and will be particularly described in that connection.

BACKGROUND OF THE INVENTION

An integral part of an aircraft fuselage is the door assembly through which passengers and crew enter and exit the aircraft. The door assemblies of modern aircraft include latch mechanisms that lock the door in place when it is closed and unlock the door when it is opened. The actual opening and closing of the door assemblies are controlled by handle assemblies that actuate the latch mechanisms. Most of the handle assemblies are provided with interior and exterior handles so that the door assemblies in which they are installed may be opened or closed from either inside or outside the aircraft by their respective handles. Typically the exterior handle, or outside handle, is normally stored within an exterior housing which is mounted within the aircraft door such that the exterior handle is flush with the outer skin of the aircraft so as not to degrade the aerodynamic efficiency of the fuselage. Regardless of the large pressure differentials that may develop between the inside of the aircraft, which is usually pressurized, and the outside low ambient pressure at high altitudes, the handle assembly must keep the exterior handle locked in place so that it does not "pop out" in flight. Inadvertent extension of the exterior handle can disrupt airflow around the aircraft and degrade aerodynamic performance. Furthermore, extension of the exterior handle could lead to its movement so as to cause self-actuation of the handle assembly and the associated latch mechanism.

Various types of handle assemblies which actuate differing types of latch mechanisms have been developed for securing aircraft doors to an aircraft. For example, one type of handle assembly which actuates a door latch mechanism for securing an aircraft door to an aircraft utilizes an exterior handle that is independent of the interior handle. In order to allow passengers to disembark the aircraft, the aircraft door may be opened from the interior of the aircraft by cycling the interior handle to open the door latch; however, because the exterior handle is independent of the interior handle, the exterior handle remains in the stowed position. In the stowed position the exterior handle is generally retained within a recess of the aircraft door or a housing such that it is flush with the outer skin of the aircraft and usually signifies to the assisting ground crew that the door latch is properly closed.

A disadvantage of this handle assembly is that after the passengers have again boarded the aircraft and the aircraft door is subsequently closed by use of the interior handle, it is virtually impossible for the assisting ground crew to visually verify whether or not the interior handle has been cycled closed and that the door latch is in fact properly closed. This is because the exterior handle has remained in the stowed position during the cycling of the door latch mechanism from the closed, open, and back to closed state because of the independence of the exterior handle from the interior handle. Therefore, when the aircraft is preparing for flight, the assisting ground crew cannot visually verify that the door latch is in fact closed and cannot be assured that a potentially unsafe flight condition may not occur due to the aircraft door not being properly closed upon the subsequent flight of the aircraft.

Another type of handle assembly includes an exterior handle that is spring loaded such that the exterior handle is driven out of the recess in the exterior housing as soon as an operator begins to rotate the interior handle towards the open position. A disadvantage of this type of handle assembly is that in order to actuate the latch mechanism and close the aircraft door from the inside of the aircraft two separate steps are required. First, the operator must rotate the interior handle to the closed position. Second, the operator must stow the exterior handle. The exterior handle is stowed, i.e. retracted back within the recess of the exterior housing, by some form of secondary device such as a pull knob.

A further disadvantage of this type of handle assembly is that the presence of a pull knob or some other secondary device may possibly cause confusion to passengers in the emergency operation of the aircraft door. The Federal Aviation Administration's (FAA) regulations related to the emergency exit of aircraft, at Section 25.809(c) of Chapter I of Title 14 of the Code of Federal Regulations, states that "the means of opening emergency exits must be simple and obvious and may not require exceptional effort . . . " 14 CFR §25.809(c). The presence of a secondary device on an aircraft door which serves as a passenger emergency exit could possibly make the opening of the aircraft door in an emergency situation appear complex to passengers and may possibly cause confusion as to how to open the door. Therefore, this type of handle assembly may not be in compliance with FAA regulation 14 CFR §25.809(c).

In view of the above, it should be appreciated that there is a need for a handle assembly that actuates a latch mechanism for the opening and closing of an aircraft door that provides the advantages of having an exterior handle that is not independent from the interior handle, requires the operator of the interior handle to perform only one step to properly close the aircraft door, and does not require any secondary devices, such as a pull knob, to stow the exterior handle and properly close the aircraft door. The present invention satisfies theses and other needs and provides further related advantages.

SUMMARY OF THE INVENTION

The present invention is embodied in a handle assembly that actuates a latch mechanism for the opening and closing of an aircraft door that includes an exterior handle that is not independent from the interior handle, requires the operator of the interior handle to perform only one step to properly close the aircraft door, and does not require any secondary devices, such as a pull knob, to stow the exterior handle and properly close the aircraft door.

The handle assembly of the present invention is used for actuating the latch mechanism of an aircraft door to control the opening and the closing of the aircraft door. The handle assembly is mountable to the aircraft door. The handle assembly includes an interior handle, an actuator, an exterior housing having a recess, and an exterior handle. The interior handle has an open position and a closed position and is connected to the actuator. The actuator is rotatably mounted within the exterior housing and the exterior housing is mountable within the aircraft door. The actuator may be secured to the latch mechanism of the aircraft door and the latch mechanism may be operated by the actuator. The latch mechanism controls the opening and closing of the aircraft door. The exterior handle also has an open position and a closed position and is coupled to the actuator. The rotation of the interior handle between the closed and open position moves the actuator such that the latch mechanism is actuated between closed and open positions allowing the aircraft door to be opened.

A significant feature of the handle assembly of the present invention is that it utilizes an exterior handle that is not independent from the interior handle. The handle assembly of the present invention includes a cam that is connected to the interior handle and that is rotatably mounted relative to the exterior handle. In order to allow passengers to disembark the aircraft, the aircraft door may be opened from the interior of the aircraft by cycling the interior handle to open the door latch. The initial rotation of the interior handle from the closed position towards the open position rotates the cam such that the exterior handle is pushed outwards from the recess of the exterior housing so that the exterior handle is no longer stowed (i.e. no longer flush with the skin of the aircraft). During the further rotation of the interior handle towards the open position, the exterior handle rotates in unison with the interior handle towards the open position as the latch mechanism of the aircraft door is opened. This is advantageous because the exterior handle in the non-stowed position allows the assisting ground crew to visually verify that the interior handle has been cycled to the open position and that the latch mechanism of the aircraft door is in fact open.

After the passengers have again boarded the aircraft, the aircraft door may be properly closed from the interior of the aircraft by cycling the interior handle to close the door latch. The interior handle is connected to the exterior handle such that during the rotation of the interior handle, the exterior handle rotates with the interior handle as the latch mechanism of the aircraft door is closed. As will described later, when the aircraft door is closed from the interior of the aircraft, a biasing element of the handle assembly automatically pulls the exterior handle into the recess of the exterior housing stowing the exterior handle and securing the handle assembly in the closed position. Advantageously, the assisting ground crew can visually verify that the exterior handle is in the stowed position which indicates to the ground crew that the interior handle has been cycled closed and that the door latch is most likely properly closed. Therefore, when the aircraft door is closed and the aircraft is preparing for flight, the ground crew can be assured that the interior handle is probably closed and that a potentially unsafe flight condition will probably not occur due to aircraft door not being properly closed upon the subsequent flight of the aircraft.

Another important feature of the handle assembly of the present invention is that the operator of the interior handle can close the aircraft door in only one step by simply rotating the interior handle to the closed position. The handle assembly of the present invention includes a biasing element, such as a spring, which forces the exterior handle towards its closed position such that it is retained within the recess of the exterior housing and is flush with the outer skin of the aircraft. Therefore, when the operator rotates the interior handle to the closed position the latch mechanism secures the aircraft door to the aircraft and the exterior handle is automatically pulled into the recess of the exterior housing securing the handle assembly in the closed position. This is advantageous in that the operator can easily close the aircraft door in one simple motion without the additional steps that are sometimes required with other types of handle assemblies.

A further related advantage of the handle assembly of the present invention is that when the aircraft door is closed from the interior of the aircraft, as previously described, no secondary devices, such as a pull knob, are required to stow the exterior handle and properly close the aircraft door. This is because the biasing element of the handle assembly automatically pulls the exterior handle into the recess of the exterior housing stowing the exterior handle and securing the handle assembly in the closed position. The Federal Aviation Administration's (FAA) regulations related to the emergency exit of aircraft, at Section 25.809(c) of Chapter I of Title 14 of the Code of Federal Regulations, states that "the means of opening emergency exits must be simple and obvious and may not require exceptional effort . . . " 14 CFR §25.809(c). The presence of a secondary device on an aircraft door which serves as a passenger emergency exit could possibly make the opening of the aircraft door in an emergency situation appear complex to passengers and may possibly cause confusion as to how to open the door. Advantageously, the handle assembly of the present invention does not require any secondary devices because the biasing element of the handle assembly automatically stows the exterior handle. Therefore, the handle assembly of the present invention, when used with an aircraft door which serves as a passenger emergency exit, most likely complies with FAA regulation 14 CFR §25.809(c) and creates an aircraft door which is safer for passengers during an emergency exit.

Other features and advantages of the present invention will become apparent from the following description of the preferred embodiments, taken in conjunction with the accompanying drawings, which illustrate, by way of example, the principles of the invention.

BRIEF DESCRIPTION OF THE DRAWINGS

FIG. 9 is a partial sectional and partial exploded view of the handle assembly taken along line 9—9 of FIG. 1, showing the handle assembly in the closed position.

FIG. 10 is a partial sectional and partial exploded view of the handle assembly taken along line 10—10 of FIG. 1, showing the handle assembly in the closed position.

FIG. 12 is a partial sectional view of the handle assembly taken along line 12—12 of FIG. 11, showing the handle assembly in the partially open position.

FIG. 13 is a partial sectional and partial perspective view of the handle assembly taken along line 13—13 of FIG. 11, showing the handle assembly in the partially open position.

FIG. 14 is a partial sectional and partial perspective view of the handle assembly taken along line 14—14 of FIG. 11, showing the handle assembly in the partially open position.

FIG. 16 is a partial sectional view of the handle assembly taken along line 16—16 of FIG. 15, showing the handle assembly in the open position.

DETAILED DESCRIPTION OF THE PREFERRED EMBODIMENTS

Figure 1:
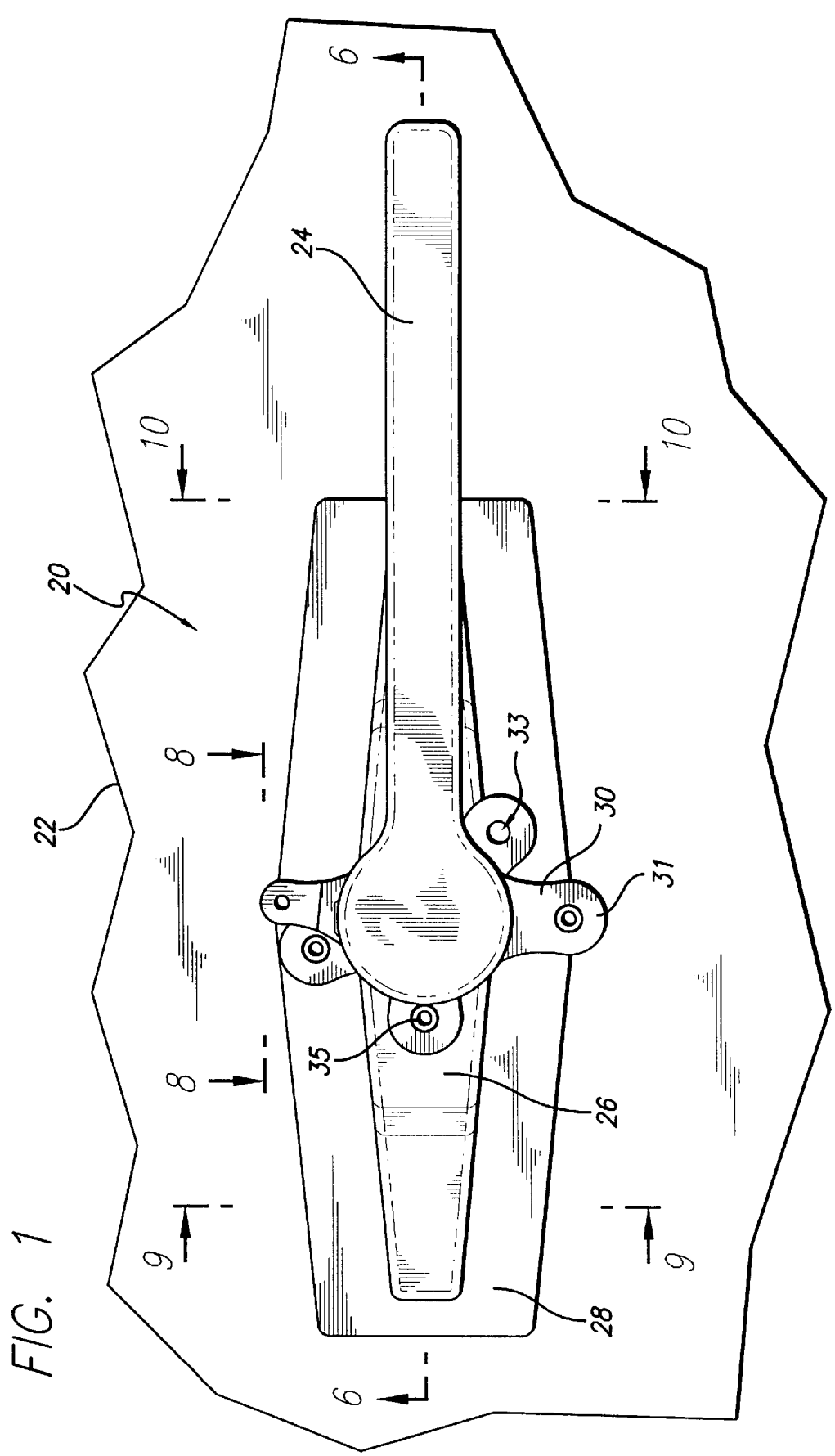
FIG. 1 is a top view showing a handle assembly according to the present invention in the closed position mounted to an aircraft door.
Figure 2:
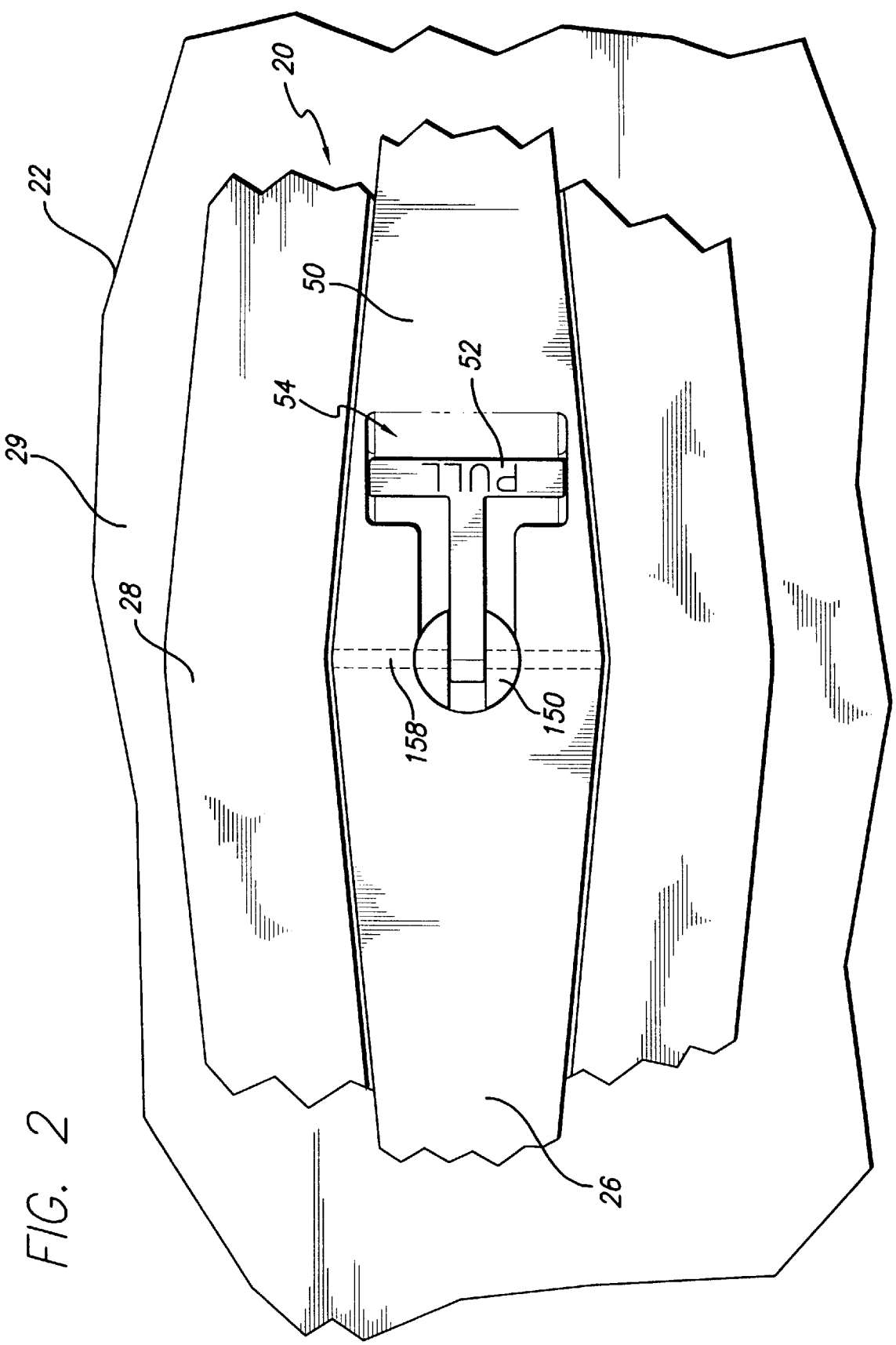
FIG. 2 is a bottom view of the handle assembly of FIG. 1 in the closed position mounted to the aircraft door.

As shown in the exemplary drawings, and with particular reference to FIGS. 1 and 2, the present invention is embodied in a handle assembly 20 that actuates a latch mechanism for the opening and closing of a body member, such as an aircraft door 22. As will be discussed later, the handle assembly 20 has a closed position, a partially open position, and an open position. The handle assembly 20 is mounted to the aircraft door 22. The handle assembly includes both an interior handle 24 and an exterior handle 26. The exterior handle 26 is preferably retained within an exterior housing 28 that is mounted within the aircraft door 22. The exterior housing 28 is mounted such that it is flush with the outside skin 29 of the aircraft door 22. Preferably, when the handle assembly is in the closed position, the exterior handle 26 is stowed within the exterior housing 28 such that it is flush with respect to the exterior housing and the outside skin 29 of the aircraft door 22.

The handle assembly 20 includes an actuator 30 having a plurality of transversely protruding ears 31 containing circular holes 33. Spherical rod end bearings 35 are mounted within the holes 33 of some of the ears 31. Rods may be mounted within the holes 33 to act as a mechanical interface between the handle assembly 20 and a standard latch mechanism (not shown). The handle assembly 20 of the present invention may therefore actuate a standard latch mechanism to open and close the aircraft door. Since standard latch mechanisms operable by handles for controlling aircraft doors are well known in the art, such as the latch mechanism operable by a handle utilized with a Learjet aircraft door, the latch mechanism will not be described. It should be appreciated that the handle assembly of the present invention may be utilized with differing sorts of standard latch mechanisms for the operation of aircraft doors on a variety of different aircraft.

Figure 3:
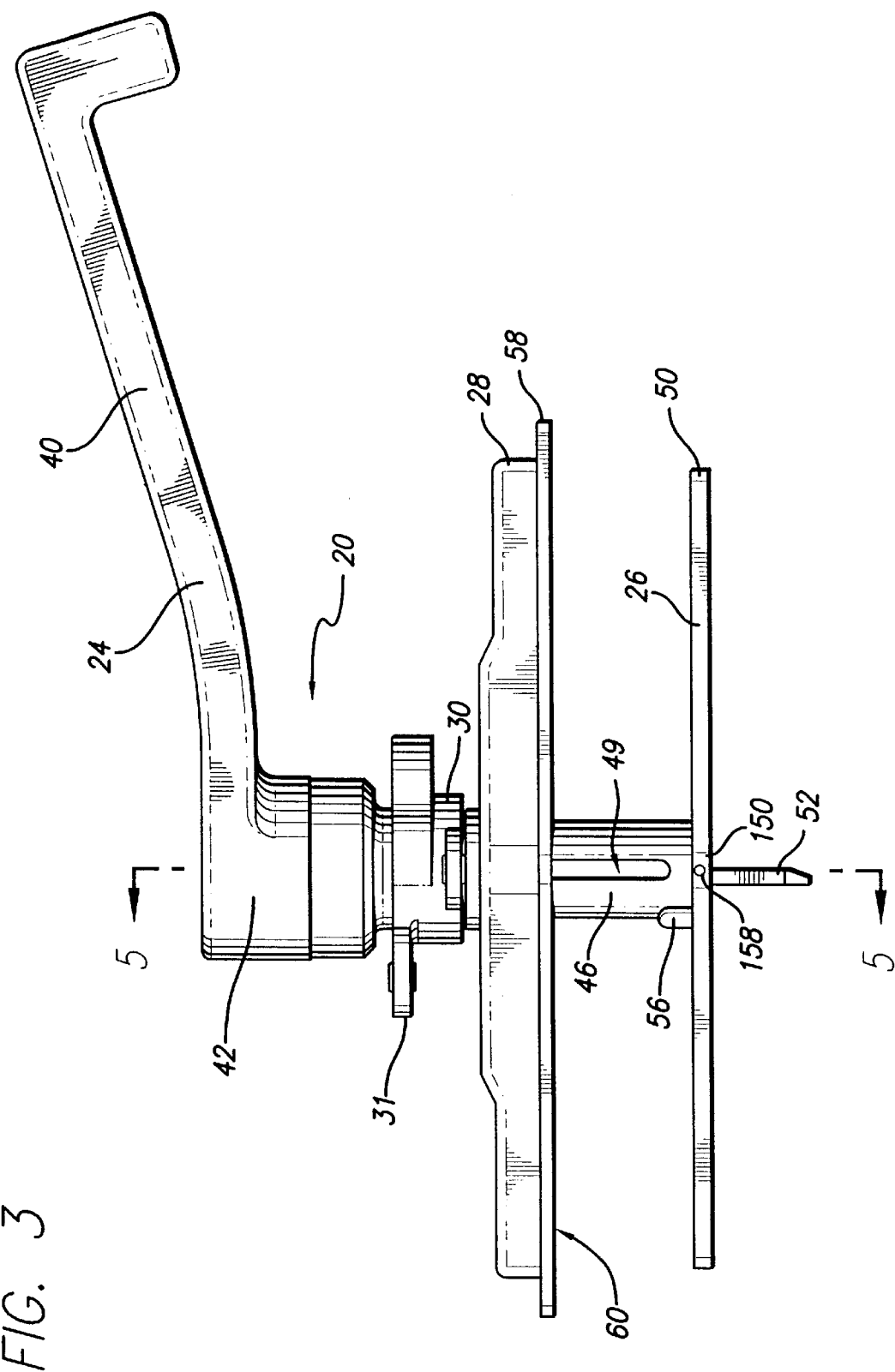
FIG. 3 is a side view of the handle assembly of FIG. 1 with an exterior handle fully extended.
Figure 4:
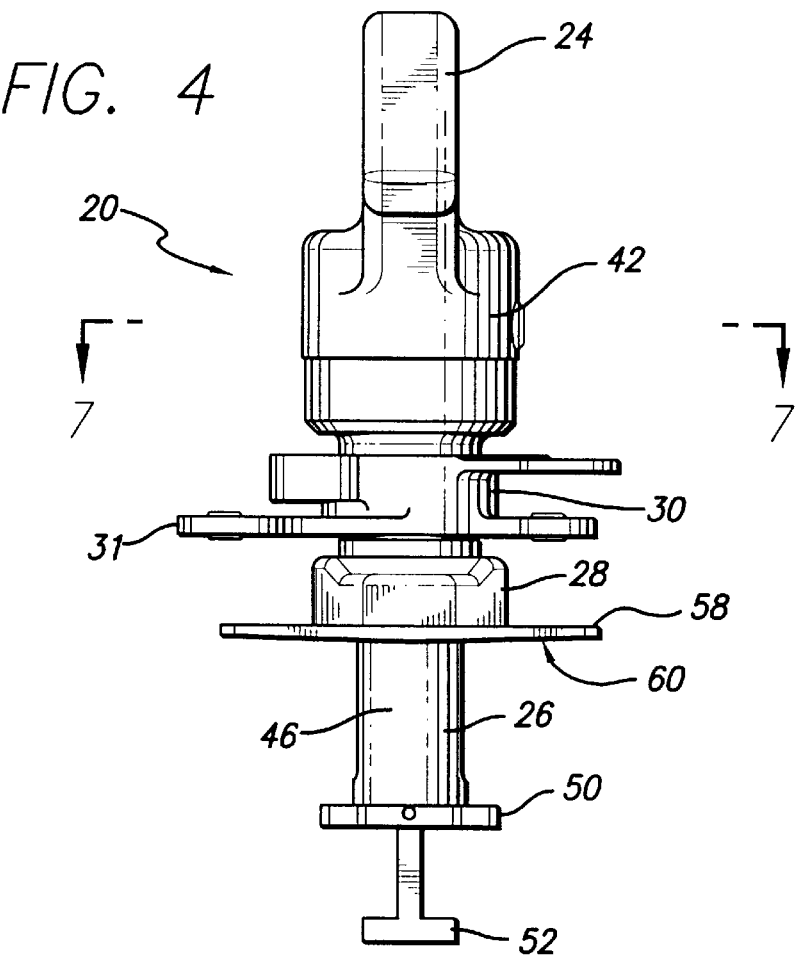
FIG. 4 is a back view of the handle assembly of FIG. 1 with the exterior handle fully extended.

With reference to FIGS. 3 and 4, the handle assembly 20 includes the interior handle 24, the exterior handle 26, the exterior housing 28, the actuator 30, and an internal cam mechanism which will be discussed later. The interior handle 24 comprises an angled L-shaped bar 40 and a cylindrical head 42 for accepting the actuator 30. Preferably, the exterior handle 26 is approximately T-shaped having a tubular body 46 and a base portion 50. The tubular body 46 includes a pair of aligned slotted openings 49. The base portion 50 also preferably includes a T-bar 52 contained in a T-shaped aperture 54 (see FIG. 2). As will be discussed later, the T-bar 52 may be pivoted open and used to manually pull the exterior handle 26 out of the exterior housing 28 so that the aircraft door may be opened from outside the aircraft. Preferably, the exterior handle also includes an upwardly projecting finger 56 that protrudes from the base 50 of the handle adjacent to the tubular body 46. The finger 56 is initially located within the exterior housing when the handle assembly 20 is in the closed position. The purpose of the finger 56 will be described in detail later. The exterior housing 28 is preferably channel-shaped in cross section and includes a peripheral flange 58. The exterior housing 28 also defines a recess 60 for stowing the base portion 50 of the exterior handle 26. Preferably, the exterior housing is made from aluminum.

Figure 5:
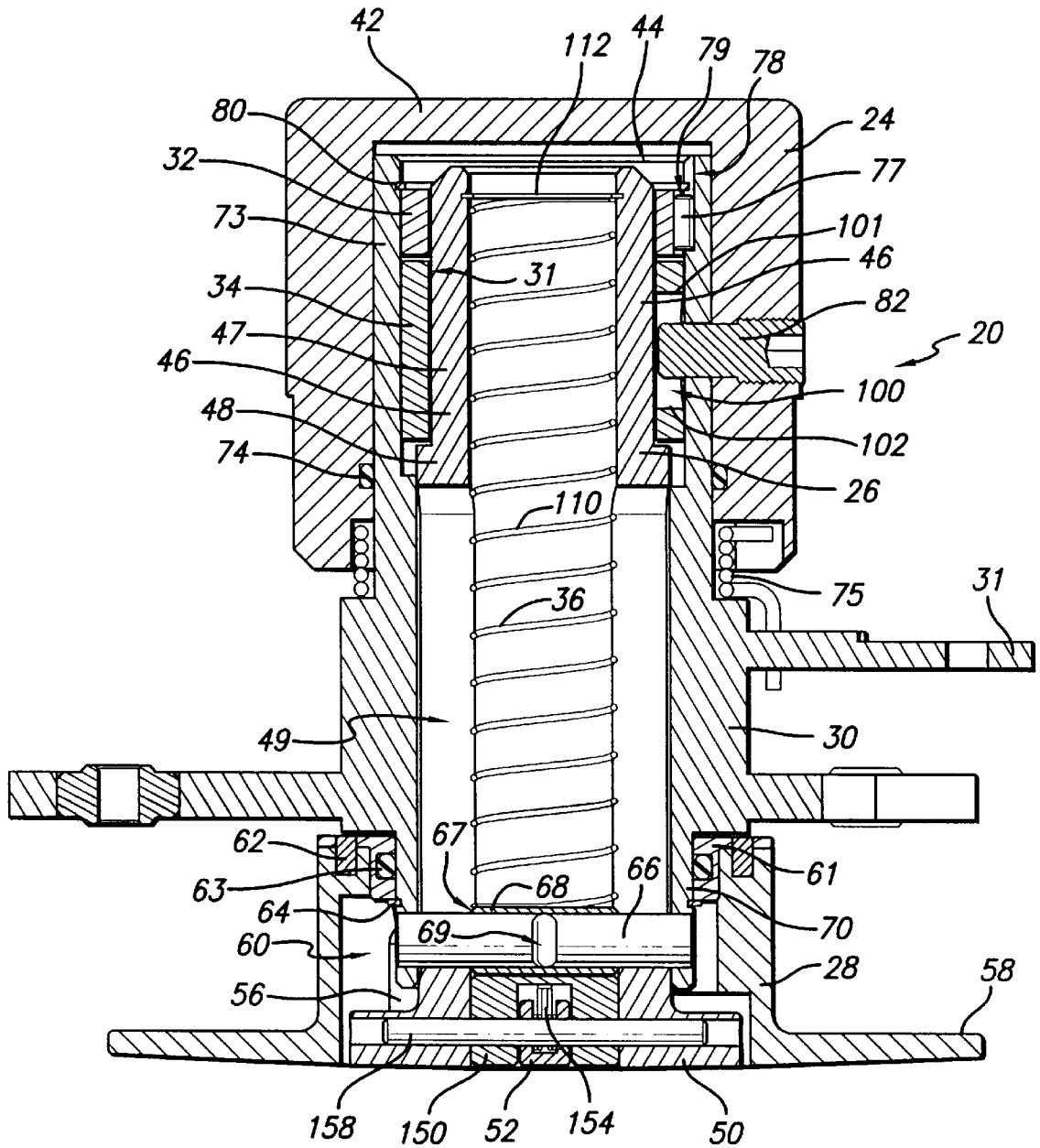
FIG. 5 is a sectional view of the handle assembly taken along line 5—5 of FIG. 3, showing the handle assembly in the closed position.
Figure 6:
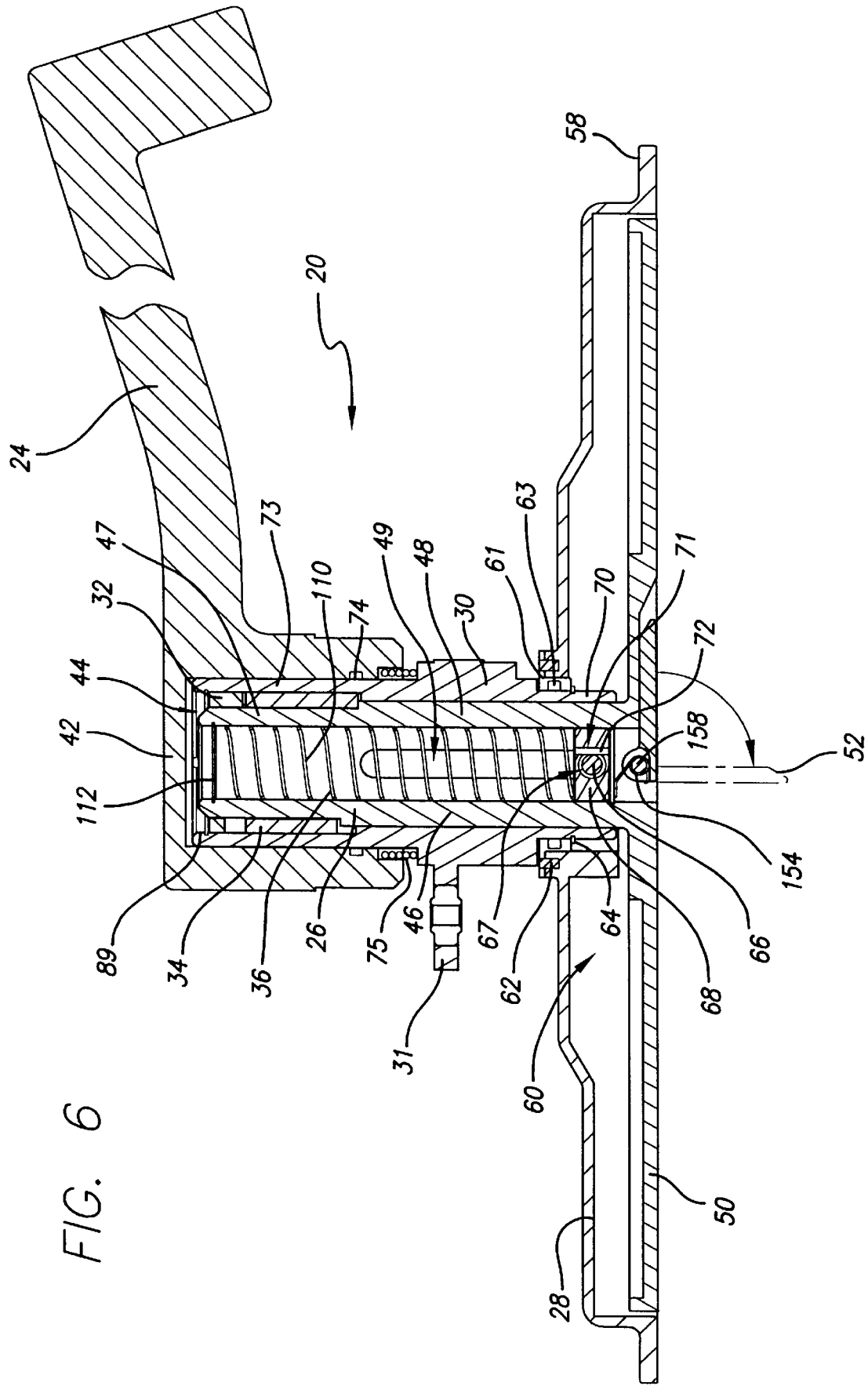
FIG. 6 is a sectional view of the handle assembly taken along line 6—6 of FIG. 1, showing the handle assembly in the closed position.

With reference to FIGS. 5 and 6, the actuator 30 is preferably an approximately cylindrically shaped structure having a plurality of transversely protruding ears 31. The actuator 30 has a bottom portion 70 which is accepted within the recess 60 of the exterior housing 28. The actuator 30 is rotatably mounted to the exterior housing 28 by a flanged pilot bushing 61 interposed between the actuator 30 and the exterior housing 28. The bushing 61 accepts the bottom portion 70 of the actuator 30 and is secured to the exterior housing 28 by pins 62. Preferably, the bushing 61 may be made of steel and is press fit between the exterior housing 28 and the actuator 30. The pins 62 are preferably press fit to the bushing 61 and the exterior housing 28 and prevent the relative movement of the bushing 61, i.e. the pins prevent the bushing from twisting due to the rotation of the actuator. A quad ring 63 may be interposed between the actuator 30 and the bushing 61 to provide a proper seal between the bushing and the actuator. Preferably, the quad ring 63 may be made from a synthetic rubber type of material. A retaining ring 64 secures the bottom portion 70 of the actuator 30 within the exterior housing 28.

The tubular body 46 of the exterior handle 26 is mounted within the actuator 30. The tubular body 46 has an upper portion 47 that is radially smaller than a lower portion 48. The actuator 30 is coupled to the exterior handle 26 by a coupling pin 66. The coupling pin 66 is mounted transversely through the bottom portion 70 of the actuator, through a hole 67 in a plug 68 that is mounted within the tubular body 46 of the exterior handle, and through the slotted openings 49 of the exterior handle. The coupling pin 66 is slip fit through the hole 67 in the plug 68. The coupling pin 66 preferably includes a circumferential groove 69 which aligns with an off-center transversely extending slot 71 in the plug 68. A retaining pin 72 is wedged within the slot 71 of the plug 68 and within the groove 69 of the coupling pin 66 securing and locating the coupling pin 66 within the plug. Preferably, the plug 68 may be made from steel.

The actuator 30 also has a top portion 73 which is accepted within a recess 44 formed by the cylindrical head 42 of interior handle 24. Preferably, a quad ring 74 may be interposed between the interior handle 24 and the actuator to provide a proper seal between the interior handle and the actuator. The quad ring 74 may preferably be made from a synthetic rubber type of material. Also, a return spring 75 may be connected between the interior handle and the actuator. The return spring 75 is biased such that as the interior handle 24 is rotated towards the open position it urges the interior handle back to the closed position. The return spring 75 will automatically bias the interior handle 24 back to its closed position when the interior handle is in the partially open position (within the first 30 degrees of rotation) to be discussed later.

With particular reference to FIG. 5, the handle assembly 20 includes an internal cam mechanism 31 which includes a cylindrical cap 32, a cylindrical cam 34, and a biasing element 36. The cylindrical cap 32 is mounted around the upper portion 47 of the exterior handle 26 and is affixed to the top portion 73 of the actuator 30 by a pin 77. The actuator 30 and the cap 32 each have aligned notches 78 and 79, respectively, which accept the pin 77 such that the pin 77 rigidly affixes the cap and the actuator together preventing relative rotation between the two. Preferably, a retaining ring 80 secures the cap 32 and the pin 77 to the actuator 30 and prevents the axial movement of the cap and the pin relative to the actuator. The cylindrical cam 34 is also mounted around the upper portion 47 of the exterior handle 26 and is sandwiched between the cap 32 and the lower portion 48 of the exterior handle.

Figure 7:
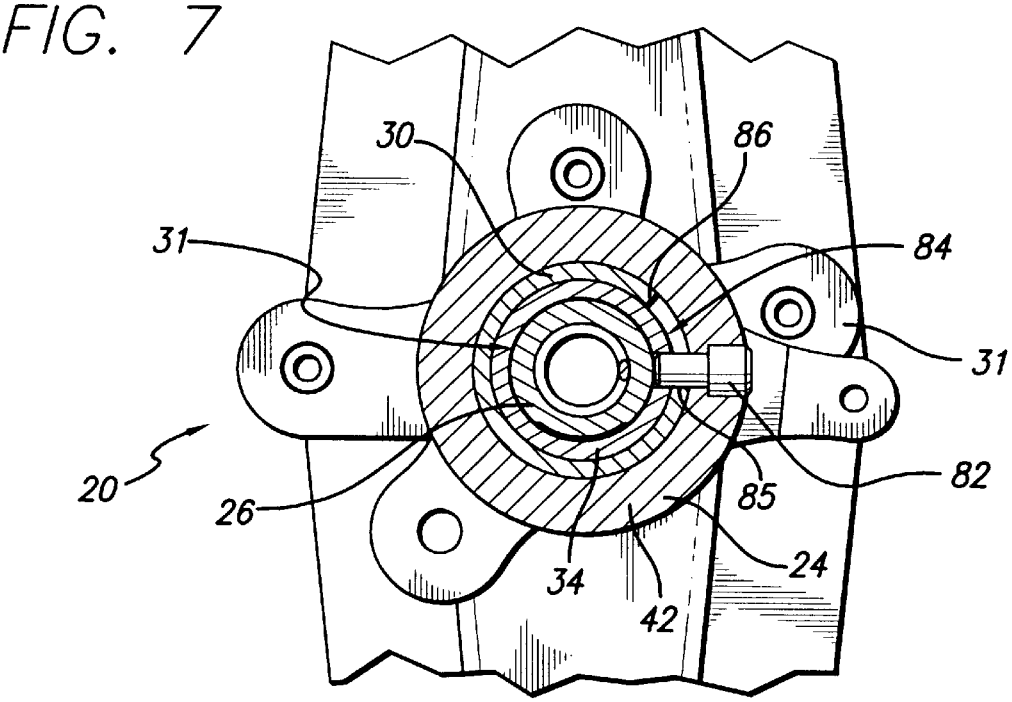
FIG. 7 is a sectional view of the handle assembly taken along line 7—7 of FIG. 4, showing the handle assembly in the closed position.
Figure 8:
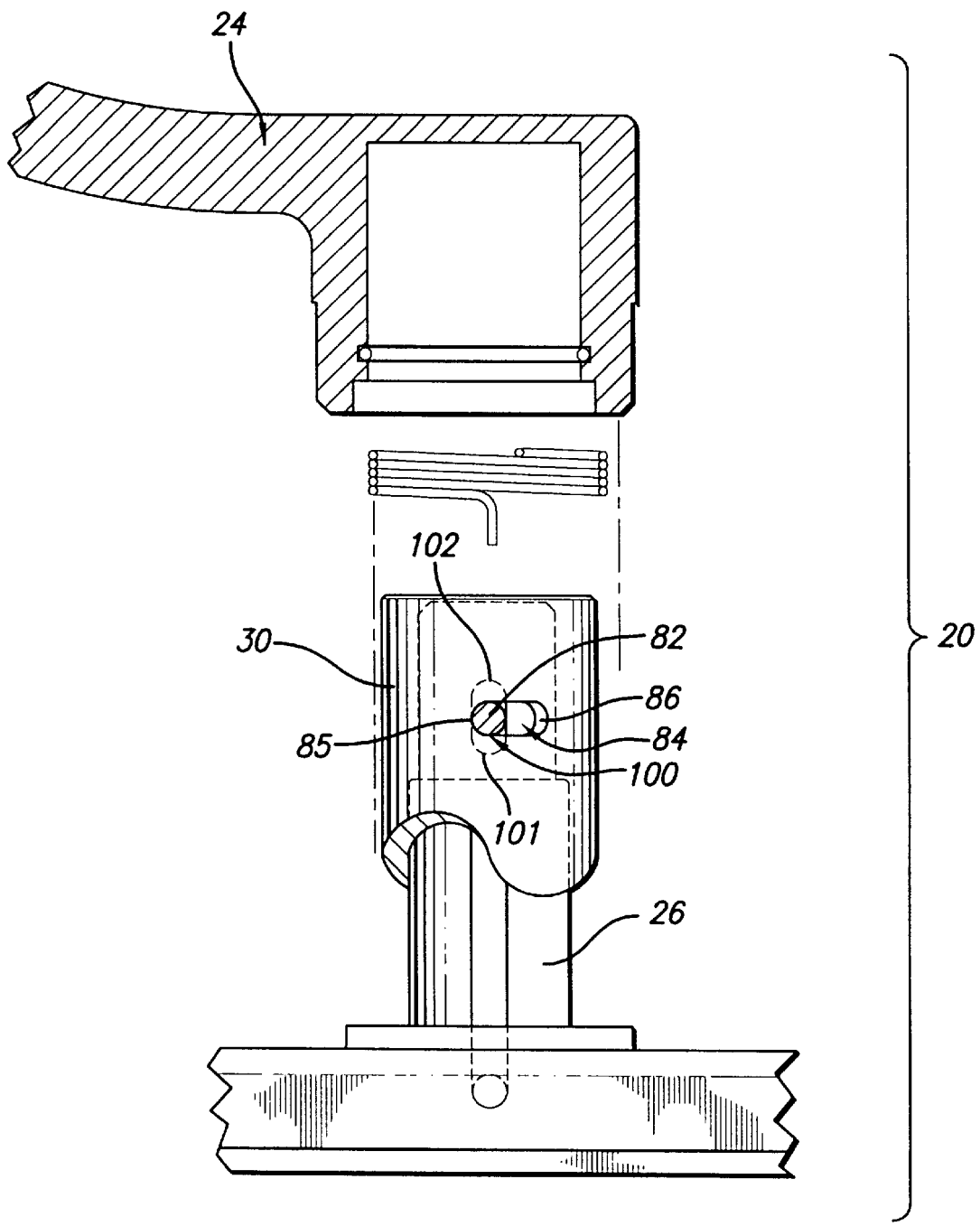
FIG. 8 is a partial sectional and partial exploded view of the handle assembly taken along line 8—8 of FIG. 1, showing the handle assembly in the closed position.

With reference to FIGS. 7 and 8, preferably the actuator 30 is connected to the interior handle 24 by a step pin 82 which is threaded to the head 42 of the interior handle and passes through a circumferential slot 84 in the actuator. It should be appreciated that the following description illustrates the handle assembly 20 in the closed position. The circumferential slot 84 has a first end 85 and a second end 86. The step pin 82 is initially located at the first end 85 of the circumferential slot when the handle assembly 20 is in the closed position.

With reference to FIGS. 9 and 10, the cylindrical cap 32 includes a first preferably triangular shaped notch 90 having sides 92. The lower portion 48 of the exterior handle 26 also includes a second preferably triangular shaped notch 96 having sides 98 offset approximately 180 degrees from the first notch 90. The cylindrical cam 34 is connected to the interior handle 24 and the actuator 30 by the step pin 82 which passes through an axially extending slot 100 in the cam (see also FIG. 5). The slot 100 has a top end 101 and a bottom end 102. The step pin is initially located in the middle of the slot when the handle assembly 20 is in the closed position. The cylindrical cam 34 is sandwiched between the cap 32 and the lower portion 48 of the exterior handle. The cam preferably includes first and second triangular shaped projections 104 and 106. The first projection 104 is initially nested into the mating first notch 90 of the cap 32 when the handle assembly 20 is in the closed position. Similarly, the second projection 106 is initially nested into the mating second notch 96 of the lower portion 48 of the exterior handle 26 when the handle assembly is in the closed position.

With particular reference again to FIGS. 5 and 6, the handle assembly 20 also includes a biasing element 36 preferably comprising a spring 110. The spring 110 is mounted within the tubular body 46 of the exterior handle 26. The spring 110 is attached at a top end to the upper portion 47 of the exterior handle 26 by a retaining ring 112 and at a bottom end rests against the plug 68. As will be discussed later, once the handle assembly is opened and the exterior handle is pushed downwards out of the exterior housing 28, the spring 110 is compressed against the plug 68 so that it urges the exterior handle 26 upwards back towards its closed position such that the exterior handle is again stowed within the recess 60 of the exterior housing 28.

Figure 11:
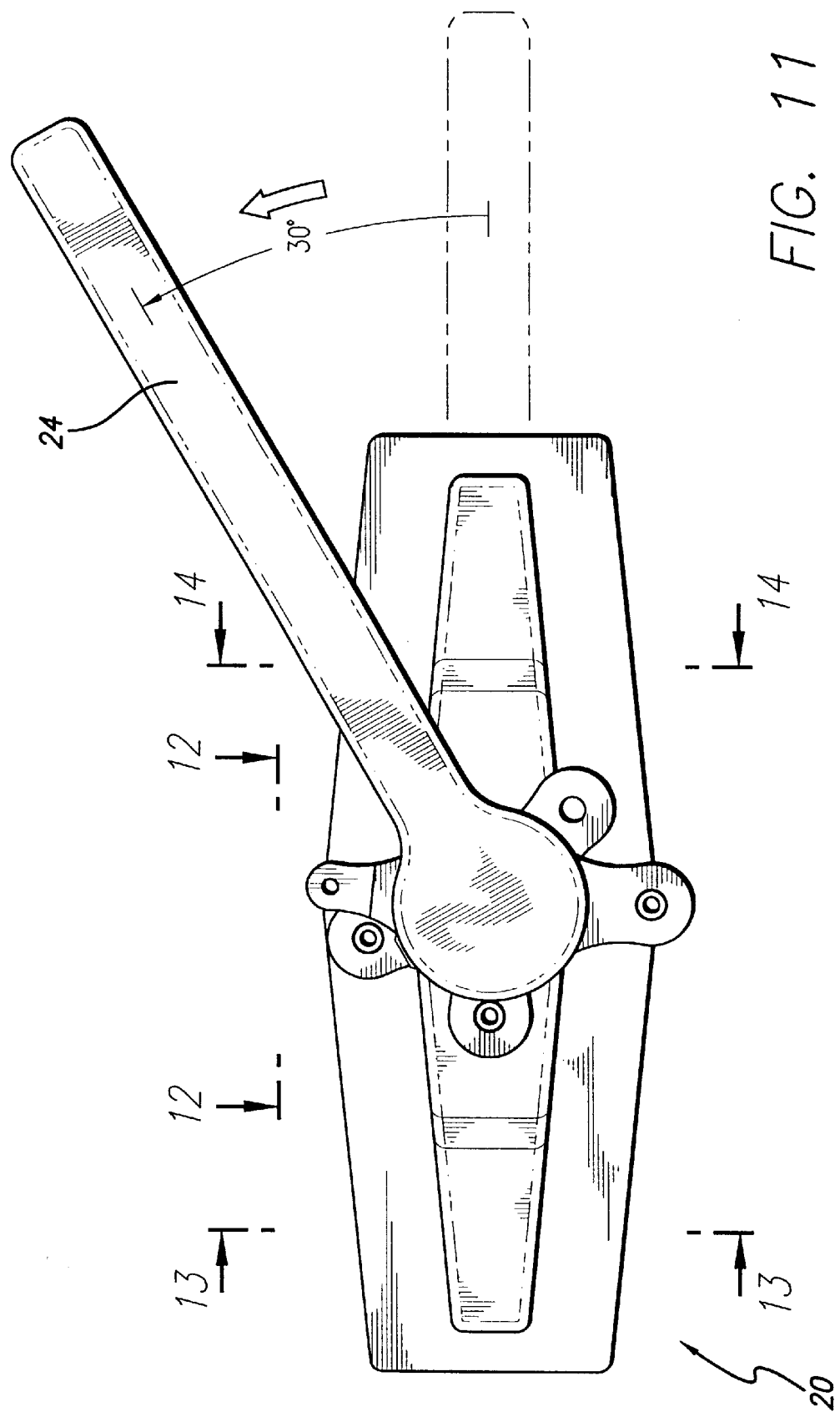
FIG. 11 is a top view showing the handle assembly in the partially open position.

The operation of the handle assembly 20 proceeds as follows. The handle assembly 20 may be opened from the closed position, previously described, to the partially open position as follows. With reference to FIG. 11, the aircraft door 22 may be opened from the interior of the aircraft to allow passengers to disembark from the aircraft by manually cycling the interior handle 24 counter-clockwise towards the open position. During the initial rotation towards the open position the interior handle 24 is preferably rotated approximately 30 degrees which actuates the handle assembly to the partially open position. With reference to FIG. 12, during the initial 30 degree rotation of the interior handle 24 the step pin 82 moves along the circumferential slot 84 of the actuator 30 from the first end 85 of the slot 84 (see FIG. 8) to the second end 86 of the slot 84 (see FIG. 12).

With reference to FIGS. 13 and 14, as the step pin 82 moves along the circumferential slot 84 of the actuator 30, the step pin 82 contained within the axially extending slot 100 of the cam 34 forces the cam 34 to also rotate approximately 30 degrees from its initial nested position (see FIGS. 9 and 10). The movement of the step pin 82 along the circumferential slot 84 of the actuator 30 allows the interior handle 24 and the cam 34 to rotate in unison approximately 30 degrees while the actuator 30, the cap 32, and the exterior handle 26 do not rotate. As the cam 34 is rotated, the first triangular shaped projection 104 of the cam rides along the side 92 of the first triangular shaped notch 90 of the cap 32 pushing the cam 34 downwards. Simultaneously, the second triangular shaped projection 106 of the cam 34 rides along the side 98 of the second triangular shaped notch 96 of the exterior handle 26 pushing the exterior handle 26 downwards in opposition to the force of the spring 110 (see FIG. 5) such that the spring is compressed against the plug 68. The spring 110 is therefore biased such that it exerts a force tending to pull the exterior handle upwards back towards its initial closed and stowed position. As the cam 34 is rotated and pushed downwards the step pin 82 moves from the middle of the axially extending slot 100 (see FIG. 10) to the top end 101 of the axially extending slot (see FIG. 13).

With reference again to FIGS. 12 and 13, the rotation of the cam 34 pushes the exterior handle 26 downwards approximately 0.30 inches from its initial position, without rotating the exterior handle, such that the base portion 50 of the exterior handle is extended outwards from the recess 60 of the exterior housing 28. The finger 56 is also moved out of a land 113 located within the recess 60 of the exterior housing 28 (see also FIG. 9). It should be appreciated that the slotted openings 49 allows the exterior handle to move downwards along the coupling pin 66. The exterior handle is therefore no longer stowed and flush with the respect to the exterior housing and the outside skin 29 of the aircraft door.

Figure 15:
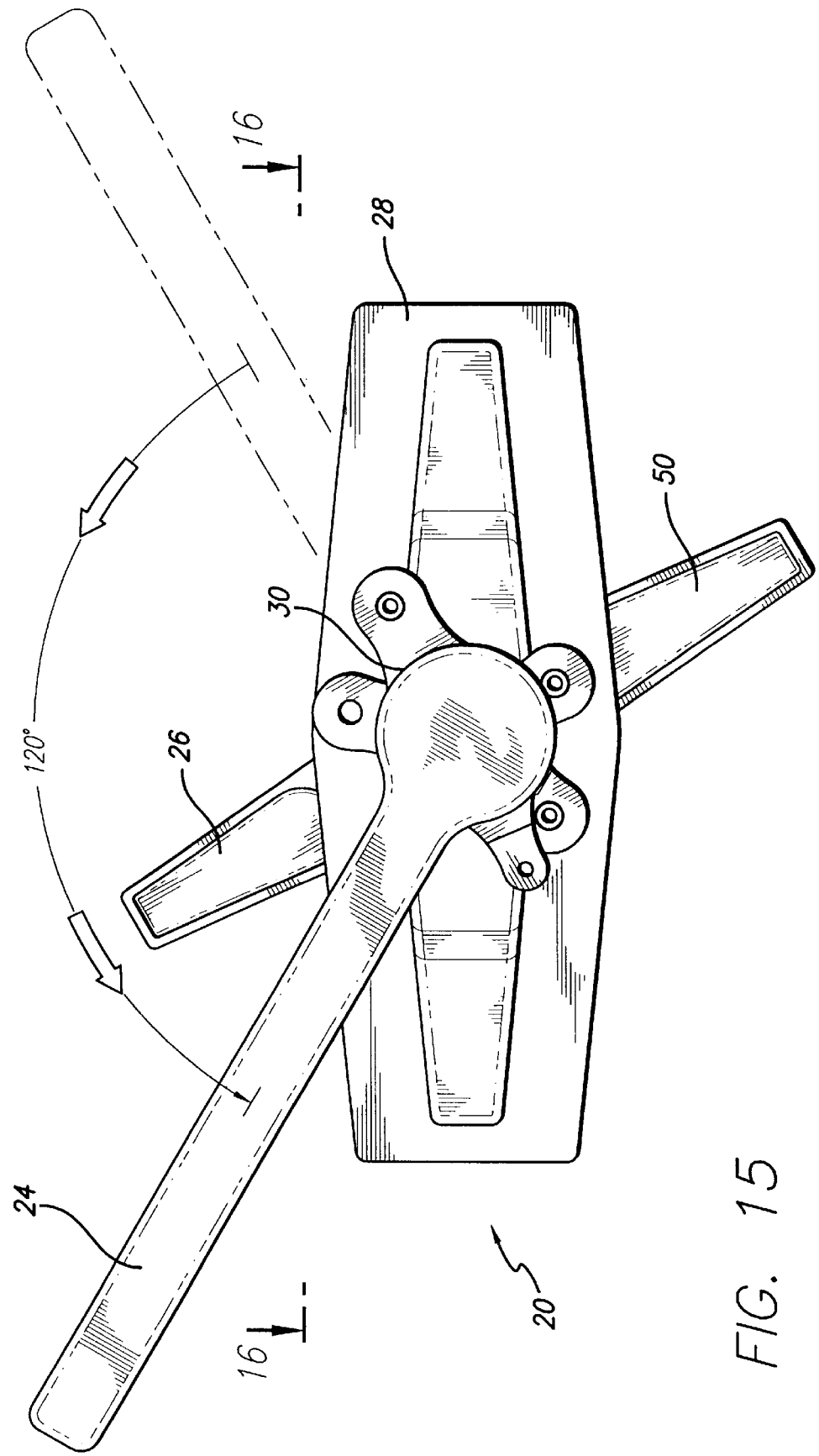
FIG. 15 is a top view showing the handle assembly in the open position.

With reference to FIG. 15, the handle assembly 20 may be opened from the partially open position, previously described, to the open position as follows. The handle assembly 20 may be fully opened by further rotating the interior handle 24 counter-clockwise approximately an additional 120 degrees. With reference to FIG. 16, because the step pin 82 is already located at the second end 86 of the slot 84 of the actuator 30 and at the top end 101 of the axially extending slot 100 of the cam 34, the further rotation of the interior handle 24 forces the actuator 30, the cap 32, and cam 34 to rotate in unison with the interior handle (see also FIG. 13). Furthermore, because the exterior handle 26 is coupled to the actuator 30 by the coupling pin 66, the exterior handle 26 also rotates in unison with the interior handle. As the exterior handle 26 is rotated, the finger 56 protruding from the base 50 of the exterior handle rides along a ledge 120 of the exterior housing 28 and prevents the exterior handle from being pulled back into the exterior housing due to the opposing force of the spring 110. The exterior handle 26 therefore remains in the non-stowed position and remains extended the approximate 0.30 inches during the further 120 degree rotation of the interior and exterior handle. After the interior handle has been rotated the additional 120 degrees to the open position, the latch mechanism will be actuated to its open position such that the aircraft door 22 may be opened. This is advantageous because the exterior handle in the non-stowed position allows the assisting ground crew to visually verify that the interior handle has been cycled to the open position and that the latch mechanism of the aircraft door is in fact open.

The aircraft door 22 may be properly closed from the interior of the aircraft by cycling the interior handle 24 back to the closed position such that the latch mechanism is actuated to its closed position and the aircraft door is properly closed. The process by which the handle assembly 20 is closed is simply the reverse of the process by which the handle assembly is opened. The interior handle 24 is rotated clockwise approximately 150 degrees. During the initial approximate 30 degrees of rotation the step pin 82 moves along the circumferential slot 84 of the actuator 30 from the second end 86 of the slot 84 (see FIG. 16) to the first end 85 of the slot 84 (see FIG. 8). During this initial rotation only the interior handle 24 and cam 34 move, while the actuator 30, the cap 32, and the exterior handle 26 do not rotate. During the subsequent 120 degrees of clockwise rotation the actuator 30, the cap 32, the cam 34, the exterior handle 26, and the finger 56 rotate in unison with the interior handle 24. At the end of the 120 degree rotation the finger 56 falls of the ledge 120 resulting in the spring 110 automatically pulling the exterior handle 26 upwards. With reference again to FIGS. 9 and 10, the exterior handle is again stowed within the recess 60 of the exterior housing 28 and the finger 56 is again stowed within the land 113. The spring action of spring 110 also forces the cam 34 to return to its closed position wherein the cam's first and second projections 104 and 106 are again nested into their mating notches 90 and 96 of the cap 32 and exterior handle 26, respectively. Also the step pin 82 moves back to the middle of the axially extending slot 100. The exterior handle is therefore flush with respect to exterior housing and the outside skin of the aircraft door and the handle assembly 20 is secured in the closed position.

Advantageously, the aircraft door 22 can be closed from the interior of the aircraft by cycling the interior handle 24 to the closed position in one simple motion without the additional steps that are sometimes required with other types of handle assemblies. A further advantage of the handle assembly 20 is that the assisting ground crew can visually verify that the exterior handle 26 is in the stowed position which indicates to the ground crew that the interior handle has been cycled closed and that the door latch is most likely properly closed. Therefore, when the aircraft door is closed and the aircraft is preparing for flight, the ground crew can be assured that the interior handle is probably closed and that a potentially unsafe flight condition will probably not occur due to aircraft door not being properly closed upon the subsequent flight of the aircraft.

A further related and important advantage of the handle assembly 20 of the present invention is that when the aircraft door 22 is closed from the interior of the aircraft, as previously described, no secondary devices, such as a pull knob, are required to stow the exterior handle 26 and properly close the aircraft door. The presence of a secondary device on an aircraft door which serves as a passenger emergency exit could possibly make the opening of the aircraft door in an emergency situation appear complex to passengers and may possibly cause confusion as to how to open the door. Advantageously, the handle assembly 20 of the present invention does not require any secondary devices because the biasing element of the handle assembly automatically stows the exterior handle. Therefore, the handle assembly of the present invention when used with an aircraft door which serves as a passenger emergency exit most likely complies with FAA regulation 14 CFR §25.809(c) and creates an aircraft door which is safer for passengers during an emergency exit.

It should be appreciated that the handle assembly 20 and the latch mechanism may also be opened and closed from outside of the aircraft by the use of the exterior handle 26 and its associated T-bar 52. With reference again to FIG. 2, the base portion 50 of the exterior handle preferably includes a T-bar 52 contained within a T-shaped aperture 54. The T-bar 52 is rotatably mounted to the exterior handle 26. With reference again to FIGS. 5 and 6, the T-bar 52 is surrounded by a fitting 150 which extends upwardly into the exterior handle. A spring 154 is also contained within the fitting 152. A rotatable mounting pin 158 extends transversely through the interior of the exterior handle 26, the fitting 152, the T-bar 52, and the spring 154 rotatably mounting the T-bar to the exterior handle. The rotatable mounting pin 158 is stationary and provides a pivot point for the T-bar 52. The spring 154 bears against the fitting 152 and the T-bar 52 such that the spring biases the T-bar towards a closed position in which the T-bar is flush within the T-shaped aperture.

The handle assembly 20 and the door latch mechanism may be opened from the outside of the aircraft by an operator first rotating the T-bar 52 from its closed state where it is flush within the T-shaped aperture 54 to an open state where it is perpendicular to the base 50 of the exterior handle 26. The operator may then pull on the T-bar 52 retracting the exterior handle 26 from the exterior housing 28. The operator may then rotate the exterior handle approximately 120 degrees clockwise which in turn rotates the actuator 30 approximately 120 degrees clockwise opening the door latch mechanism.

The handle assembly 20 and the door latch mechanism may be closed from the outside of the aircraft by the operator rotating the exterior handle 26 approximately 120 degrees counter-clockwise which in turn rotates the actuator 30 approximate 120 degrees counter-clockwise closing the door latch mechanism. The spring 110 automatically pulls the exterior handle 26 upwards such that exterior handle is again stowed within the recess 60 of the exterior housing 28. The exterior handle is then flush with respect to exterior housing and the outside skin of the aircraft door and the handle assembly 20 is secured in the closed position. Also, the T-bar 52 is automatically biased by the spring 154 to its closed position such that it is flush within the T-shaped aperture 54.

Although the invention has been described in detail with reference to only a few preferred embodiments, those having ordinary skill in the art will appreciate that various modifications can be made without departing from the spirit of the invention. For example, it should be understood that this device could also be used to operate a variety of different aircraft door latch mechanism on various types of aircraft. With such possibilities in mind, the invention is defined with reference to the following claims.

We claim:

1. A handle assembly for actuating a latch mechanism, the handle assembly mountable to a body member, the handle assembly comprising:

an exterior housing having a recess, the exterior housing mountable within and to the body member;

an actuator rotatably mounted within the exterior housing, wherein the actuator is securable to the latch mechanism, and the latch mechanism is operable by the actuator;

an interior handle having an open and a closed position, the interior handle connected to the actuator;

an exterior handle having an open position and a closed position, the exterior handle coupled to the actuator; and a cam connected to the interior handle, and rotatably mounted relative to the exterior handle;

wherein rotation of the interior handle between the closed and open positions moves the exterior handle between the closed and open positions moving the actuator such that the latch mechanism is actuated between the closed and open positions; and wherein the initial rotation of the interior handle from the closed position towards the open position rotates the cam such that the exterior handle is pushed outwards from the recess of the exterior housing and during the further rotation of the interior handle towards the open position the exterior handle rotates with the interior handle.

2. The handle assembly of claim 1, wherein the body member is an aircraft door.

3. The handle assembly of claim 1, wherein the cam includes a plurality of protrusions, wherein during the initial rotation of the interior handle the cam rotates such that the protrusions of the cam push the exterior handle outwards from the recess of the exterior housing.

4. The handle assembly of claim 1, wherein a fastener is mounted to the interior handle and the fastener connects the interior handle with the cam and the actuator.

5. The handle assembly of claim 4, wherein the fastener is a step pin.

6. The handle assembly of claim 4, wherein the cam has an axially extending slot through which the fastener is mounted.

7. The handle assembly of claim 4, wherein the actuator has a circumferential slot through which the fastener is mounted.

8. The handle assembly of claim 4, wherein the cam has an axially extending slot through which the fastener is mounted, the cam includes a plurality of protrusions, the actuator has a circumferential slot through which the fastener is mounted, and wherein the initial rotation of the interior handle from the closed position towards the open position rotates the cam such that the plurality of protrusions push the exterior handle outwards from the recess of the exterior housing.

9. The handle assembly of claim 8, further comprising a cap, wherein the cap and the exterior handle each include triangular notches having sides, the protrusions of the cam are triangular shaped, the cam is sandwiched between the cap and the exterior handle, the triangular shaped protrusions are initially nested within the mating triangular notches, and wherein during the initial rotation of the interior handle from the closed position towards the open position the fastener rides along the axially extending slot of the cam and the circumferential slot of the actuator rotating the cam such that the plurality of triangular shaped protrusions ride along the sides of the triangular notches pushing the exterior handle outwards from the recess of the exterior housing without rotating the exterior handle.

10. A handle assembly for actuating a latch mechanism, the handle assembly mountable to a body member, the handle assembly comprising:

an exterior housing having a recess, the exterior housing mountable within and to the body member;

an actuator rotatably mounted within the exterior housing, wherein the actuator is securable to the latch mechanism, and the latch mechanism is operable by the actuator;

an interior handle having an open and a closed position, the interior handle connected to the actuator;

an exterior handle having an open position and a closed position, the exterior handle coupled to the actuator;

a cam connected to the interior handle, and rotatably mounted relative to the exterior handle; and a biasing element attached to the exterior handle, wherein, when the exterior handle is in the open position, the biasing element imposes a force urging the exterior handle towards the closed position;

wherein the rotation of the interior handle between the open and closed positions moves the actuator and the cam such that the exterior handle moves from the open to the closed position and such that the latch mechanism is actuated to the closed position; and wherein, when the interior handle is rotated from the open to the closed position, the biasing element pulls the exterior handle into the closed position such that the exterior handle is retained within the recess of the exterior housing securing the handle assembly in the closed position.

11. The handle assembly of claim 10, wherein the biasing element is a spring.

12. The handle assembly of claim 10, wherein rotation of the interior handle between the closed and open positions moves the exterior handle between the closed and open positions moving the actuator such that the latch mechanism is actuated between the closed and open positions, and wherein the initial rotation of the interior handle from the closed position towards the open position rotates the cam such that the exterior handle is pushed outwards from the recess of the exterior housing towards the open position in opposition to the force of the biasing element.

13. The handle assembly of claim 12, wherein the cam includes a plurality of protrusions, wherein during the initial rotation of the interior handle the cam rotates such that the protrusions of the cam push the exterior handle outwards from the recess of the exterior housing in opposition to the force of the biasing element.

14. The handle assembly of claim 12, wherein a fastener is mounted to the interior handle and the fastener connects the interior handle with the cam and the actuator.

15. The handle assembly of claim 14, wherein the cam has an axially extending slot through which the fastener is mounted.

16. The handle assembly of claim 14, wherein the actuator has a circumferential slot through which the fastener is mounted.

17. The handle assembly of claim 14, wherein the cam has an axially extending slot through which the fastener is mounted, the cam includes a plurality of protrusions, the actuator has a circumferential slot through which the fastener is mounted, and wherein the initial rotation of the interior handle from the closed position towards the open position rotates the cam such that the plurality of protrusions push the exterior handle outwards from the recess of the exterior housing in opposition to the force of the biasing element.

18. The handle assembly of claim 17, further comprising a cap, wherein the cap and the exterior handle each include triangular notches having sides, the protrusions of the cam are triangular shaped, the cam is sandwiched between the cap and the exterior handle, the triangular shaped protrusions are initially nested within the mating triangular notches, and wherein during the initial rotation of the interior handle from the closed position towards the open position the fastener rides along the axially extending slot of the cam and the circumferential slot of the actuator rotating the cam such that the plurality of triangular shaped protrusions ride along the sides of the triangular notches pushing the exterior handle outwards from the recess of the exterior housing in opposition to the force of the biasing element without rotating the exterior handle.

19. A handle assembly for actuating a latch mechanism, the handle assembly mountable to a body member, the handle assembly comprising:

an exterior housing having a recess, a ledge, and a land, wherein the exterior housing is mountable within and to the body member;

an actuator rotatably mounted within the exterior housing, wherein the actuator is securable to the latch mechanism, and the latch mechanism is operable by the actuator;

an interior handle having an open and a closed position, the interior handle connected to the actuator;

an exterior handle having an open position and a closed position, the exterior handle coupled to the actuator;

a finger projecting upwardly from the exterior handle;

a cam connected to the interior handle, and rotatably mounted relative to the exterior handle; and a biasing element attached to the exterior handle, wherein, when the exterior handle is in the open position, the biasing element imposes a force urging the exterior handle towards the closed position;

wherein the rotation of the interior handle between the open and closed positions moves the actuator and the cam such that the exterior handle moves from the open to the closed position and such that the latch mechanism is actuated to the closed position;

wherein, during the rotation of the interior handle between the open and closed positions, the exterior handle moves in unison with the interior handle and the finger of the exterior handle rides along the ledge of the exterior housing; and wherein, when the interior handle is rotated to the closed position, the finger falls of the ledge of the exterior housing and the biasing element pulls the exterior handle into the closed position such that the exterior handle is retained within the recess of the exterior housing, the finger is retained within the land, and the handle assembly is secured in the closed position.

20. The handle assembly of claim 19, wherein rotation of the interior handle between the closed and open positions moves the exterior handle between the closed and open positions moving the actuator such that the latch mechanism is actuated between the closed and open positions, and wherein the initial rotation of the interior handle from the closed position towards the open position rotates the cam such that the exterior handle is pushed outwards from the recess of the exterior housing towards the open position in opposition to the force of the biasing element.

* * * * *